Dec. 6, 1949     D. H. CLEWELL     2,490,579
DIRECT CURRENT MEASURING SYSTEM
Filed July 12, 1946
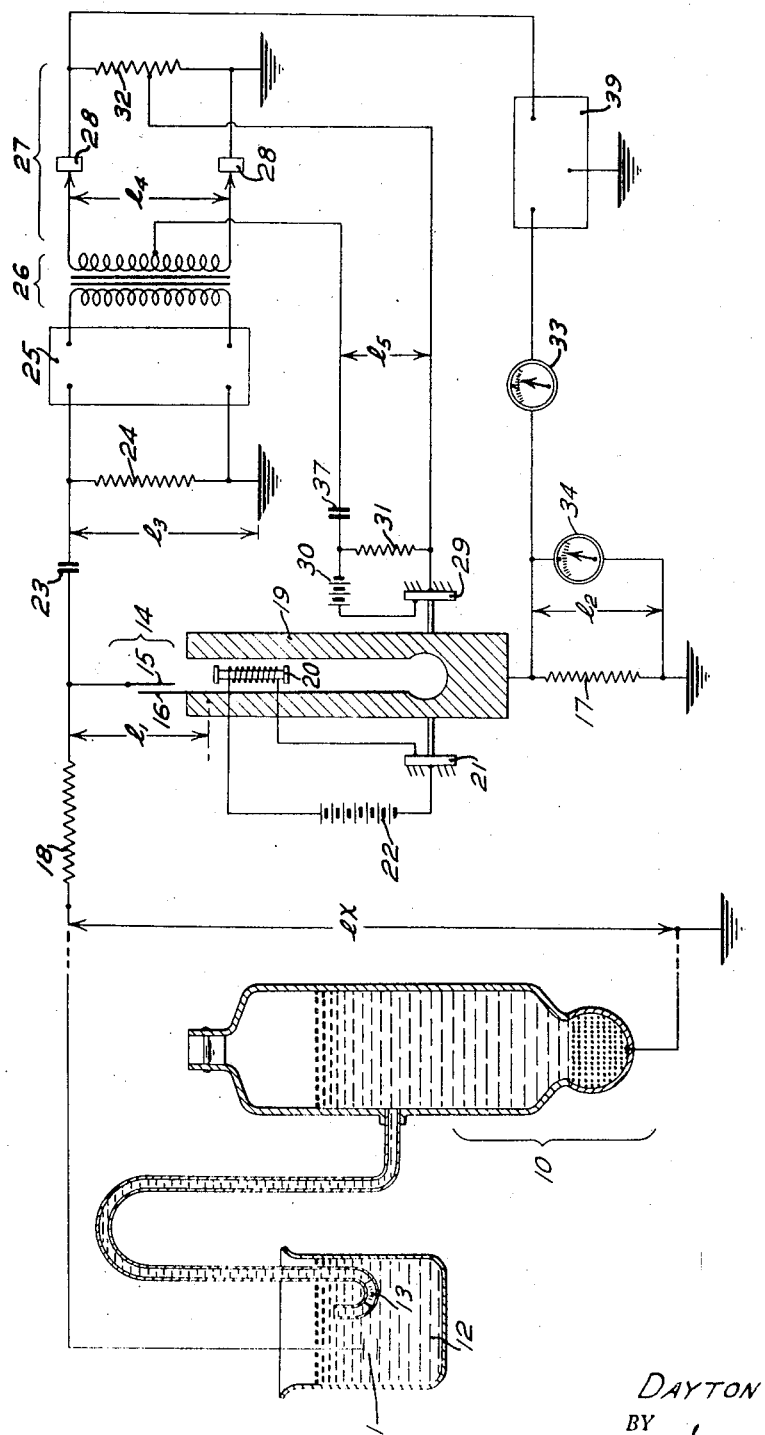
INVENTOR.
DAYTON H. CLEWELL
BY Sidney A. Johnson
ATTORNEY Patented Dec. 6, 1949

2,490,579

UNITED STATES PATENT OFFICE 2,490,579

DIRECT-CURRENT MEASURING SYSTEM

Dayton H. Clewell, Dallas, Tex., assignor, by mesne assignments, to Socony-Vacuum Oil Company, Incorporated, New York, N. Y., a corporation of New York Application July 12, 1946, Serial No. 682,988

8 Claims. (Cl. 171—95)

This invention relates to the measurement of direct-current voltages and particularly to methods and systems suited for the determination of the voltage of cells used in measurement of the conductivity or ion-concentration of liquids or of other sources similarly subject to polarization or excessive internal voltage drop if more than inappreciable current flows through them.

In accordance with the invention, the measurement is effected without inclusion of the source in any path traversed by direct current to or from the source. More particularly, the source of unknown direct-current voltage is connected in series with a condenser of periodically varying capacity and an opposing direct-current voltage which for all practical purposes of measurement is substantially equal thereto and is maintained so continuously and automatically by a high gain, negative feed-back amplifier whose input system includes, in series, said condenser and a feed-back resistor which produces the aforesaid opposing voltage. The opposing voltage may be directly or indirectly measured by any conventional means calibrated in terms of voltage, or of any condition, such as conductivity, pH, which varies as a function thereof, and suited to effect an indication, record or control.

More particularly in accordance with the preferred form of the invention, the polarity of the opposing or feed-back voltage automatically accommodates itself to the polarity or changes in polarity of the source of unknown voltage and, more specifically, is of polarity determined by a discriminator network included in the output system of the amplifier.

The invention further resides in features of operation and arrangement hereinafter described and claimed.

For more detailed understanding of the invention, reference is made to the accompanying circuit diagram of a system for measuring the ion-concentration of an electrolyte.

Referring to the drawing, the calomel half cell 10 and the platinum electrode 11 disposed in electrolyte 12 whose conductivity or ion-concentration is to be determined constitute a source of voltage $e_x$ whose magnitude is a function of the conductivity or ion-concentration. With the half cell 10 is associated a porous plug 13 or its equivalent, such as a glass diaphragm, which prevents contamination of the half cell by the electrolyte and vice versa yet permits migration of ions. The internal impedance of this source of voltage $e$ is so high that measurement of the voltage by conventional meters would be futile and misleading for the reason that most of the voltage would be dissipated internally of the source and that the remnant voltage would not be a true measure of the conductivity or of the pH of the electrolyte. Furthermore, drain of current from the source would also result in polarization; that is, bubbles or a film of gas would promptly form at the electrode and vitiate any measurements.

In the present arrangement, there is included in series with the source $e_x$ of unknown voltage, a small condenser 14 and resistance 17. The condenser 14 blocks any continuous or prolonged flow of current from or to the source $e_x$; at most as hereinafter appears, there is only a momentary flow when $e_x$ changes in magnitude and this does not cause polarization or internal voltage drop during the measurement.

The condenser 14 comprises, for example, a stationary plate 15 and one or more movable plates 16 continuously vibrated with respect thereto so that there appears across the terminals of the charged condenser 14, a voltage $e_1$ having an alternating component whose frequency corresponds with the rate of vibration of the fork 19 and whose magnitude is a function of the amplitude of vibration. The direct-current component of voltage $e_1$ is equal to the algebraic sum of $e_x$ and $e_2$, the latter being the total voltage drop across the resistor 17. To minimize and in practical sense to eliminate flow of alternating current to and through source $e_x$, there is included in circuit therewith a resistor 18 whose resistance is high compared to the sum of the resistance of resistor 17 and the reactance of capacitor 14 at the frequency of voltage $e_1$.

The movable plate or plates 16 of capacitor 14 are driven by the tuning fork 19 or equivalent vibratory member which, in the arrangement shown, is maintained in mechanically resonant vibration by electromagnet 20 in circuit with battery 22 or equivalent and a current-controlling device 21, preferably a microphone button or similar variable resistance device. As the left tine of the fork moves toward the electromagnet in response to the attractive force thereof, it progressively relieves the pressure on microphone 21, thus weakening the current in the magnet whereupon the natural resiliency of the tine causes it to move in reverse direction, whereupon the internal resistance of the microphone is decreased with consequent increase in current to the driving coil 20. This cycle repeats at frequency determined by the period of vibration of the tuning fork.

With the system in operation, there is produced across resistor 17, as later expalined, a direct-current voltage $e_2$ of polarity opposite to that of source $e_x$ and differing therefrom only by a minute amount. Consequently, the voltage $e_1$ which is the resultant of the voltages $e_x$ and $e_2$ is always small compared to $e_x$. The alternating component of $e_1$ which is designated as voltage $e_3$ is applied to the input circuit of a high gain alternating-current amplifier 25 of suitable number of stages and preferably tuned, as by filters or resonant circuits, to favor the frequency corresponding with that of voltage $e_3$. The blocking condenser 23 is provided to preclude flow of any direct current to or from the amplifier 25 from or to the source $e_x$: the reactance of the condenser 23 at the frequency of voltage $e_3$ may be substantially equal to the input resistance 24 of the amplifier, or less. For maximum efficiency the input impedance 24 of the amplifier should equal the reactance of the condenser 14 and the reactance of condenser 23 should be small compared to the reactance of condenser 14. The condenser 23 cannot be made too large, for otherwise the time constant of the input system determined mainly by condenser 23 and resistor 18 would be too long.

The output system of the amplifier 25 may include a transformer 26 across whose secondary terminals appears the alternating voltage $e_4$, an amplification of the input voltage $e_3$. This voltage is applied to the oppositely poled rectifiers 28, 28 which are connected in a bridge circuit 27 including resistor 32 and the secondary of transformer 26.

As thus far described, no current flows through the resistor 32 because of opposite poling of the rectifiers to the applied voltage $e_4$. By the arrangement now described, a reference voltage $e_5$ is introduced into the bridge circuit so that there flows through resistor 17 a direct current whose polarity is of proper sense to produce and maintain across resistor 17 a voltage $e_2$ which is in opposition to voltage $e_x$ regardless of the poling of the latter.

The alternating voltage $e_5$ is of the same frequency as the input voltag $e_4$ and is either substantially in phase with $e_4$ or substantially out of phase with $e_4$ depending upon whether $e_x$ is larger or smaller than $e_2$ at a particular instant. The polarity of the charge of the condenser 14 depends upon whether $e_x$ is larger or smaller than $e_2$. The alternating voltage $e_5$ is applied to the bridge between the electrical midpoints of the resistor 32 and the secondary of the transformer 26. In consequence, so far as voltage $e_5$ is concerned, the rectifiers are similarly poled and for one-half of each cycle pass current through their respective halves of resistor 32. The voltage drops due to this current are equal and opposite and produce no flow of current through resistor 17; however, with respect to one rectifier circuit, the voltage $e_5$ is in phase with the corresponding half of the voltage $e_4$ and with respect to the other rectifier circuit the voltage $e_5$ is out of phase with the other half of the voltage $e_4$. Thus, the presence of voltage $e_4$ tends to increase the current in one half of the resistor 32 and decrease the current in the other half. This unbalance results in a net voltage across resistor 32; and, in consequence thereof, current flows through resistor 17 and produces a voltage $e_2$ thereacross which opposes the voltage $e_x$ and is substantially equal to $e_x$.

The network 27 is in fact a phase discriminator which controls the polarity of the feed-back current supplied to resistor 17 which, in effect, is a negative feed-back resistor because included both in the input and output systems of the amplifier and having the effect of automatically reducing the input. Because of this action, whenever the direct-current voltage $e_x$ increases or decreases, there is a momentary increase or decrease in magnitude of the alternating signal voltage $e_3$ which, by action of the feed-back amplifier, immediately results in increase or decrease of the voltage $e_2$ across resistance 17 to restore equilibrium. Because of the high gain of the amplifier, the difference between the magnitudes of voltages $e_2$ and $e_x$ required to maintain equilibrium for different magnitudes of $e_x$ is so minute that for all purposes the voltage $e_2$, which can be measured in conventional manner as by a voltmeter 34 or by a series ammeter 33 calibrated in terms of voltage, is equal to unknown voltage $e_x$. In either case, the measuring instrument may, of course, be direct reading in terms of any factor which is a function of $e_x$, as for example conductivity or pH of the electrolyte 12: the meters 33, 34 are of the center-zero type so far as voltage or current measurements are concerned though their scales in pH units, for example, may increase numerically in one direction only.

The voltage $e_5$ for controlling the phase discrimination of rectifiers 28 may conveniently be produced, as shown, by a second variable resistance device 29, driven by the tuning fork 19 and in circuit with battery 30, or equivalent source, and a load resistor 31. The battery 30 may be so poled that no current therefrom flows as direct current through the rectifiers or, if independence of battery poling is desired, a blocking condenser 37 may be included in the circuit to the discriminator 27.

Preferably, and as shown, the connections from the discriminator to the feed-back resistor 17 includes a filter 39 for eliminating or minimizing any alternating-current component of the feed-back current. The frequency of the tuning fork should preferably, but not necessarily, be different from that of any power circuits in the vicinity of the measuring equipment or the leads to the source of unknown voltage to avoid possible errors due to stray fields and without need for elaborate shielding.

Use of the equipment is not limited to measurement of the open-circuit voltage of conductivity cells or of pH cells but it is particularly suited for measurement of the voltages of direct-current sources having high resistance, or which for any other reason, for example polarization, are affected by current drain from the source.

What is claimed is:

1. A system for determining the direct-current voltage of a source thereof comprising a condenser charged from said source and having relatively movable plate structures, vibratory means for effecting relative movement of said plate structures, an alternating-current amplifier having in its input system a resistor and said condenser in series, a network in the output system of said amplifier and including rectifiers oppositely poled with respect to the alternating output voltage thereof, means including said vibratory means for producing reference alternating voltage of the same frequency as the amplifier output voltage and with respect to which said rectifiers are similarly poled, means for so connecting said resistor to said network that it is traversed by direct current proportional to said first-named voltage and in direction determined by the phase relation of said reference and amplifier output voltages, and direct-current measuring means in circuit with said resistor.

2. A system for continuous measurement of the direct-current voltage of a source thereof comprising means including a condenser for producing a direct-current voltage substantially equal and opposite to that of said source and conductively isolated therefrom, means for periodically varying the capacity of said condenser, an alternating-current amplifier, a network including rectifiers oppositely poled with respect to the output of said alternating current amplifier, a resistor traversed by direct current proportional to and continuously derived from said network and in series with said condenser, said series condenser and resistor connected across the input of said amplifier and in a path including said source, and direct-current measuring means in circuit with said resistor for measurement of said continuously derived direct current.

3. A system for continuous measurement of the direct-curent voltage of a source thereof comprising means for producing a direct-current voltage substantially equal and opposite to that of said source and conductively isolated therefrom including a condenser, means for periodically varying the capacity of said condenser, an alternating-current amplifier, a reference source of alternating voltage of frequency corresponding with the periodic variation of said condenser, means for producing a direct current of magnitude and polarity determined by the magnitude and phase of input voltage applied to said amplifier comprising a network including rectifiers oppositely poled with respect to the output voltage of said amplifier and similarly poled with respect to said source of reference voltage, a resistor traversed by said direct current and in series with said condenser both in the input system of said amplifier and in a path including said direct-current source, and direct-current measuring means in circuit with said resistor.

4. A system for measuring a direct-current voltage which comprises an alternating-current amplifier whose input system includes mechanically resonant vibratory means and a resistor in series with said voltage, a network including rectifiers oppositely poled with respect to the alternating output voltage of said amplifier, a source of alternating voltage of the same frequency as said resonant vibratory means and with respect to which said rectifiers are similarly poled, means for including said resistor in circuit with said rectifier network for traverse by the direct-current output thereof, and a direct-current meter in circuit with said resistor.

5. A system for measuring the direct-current component of a voltage also having an alternating component which comprises an alternating-current amplifier whose input system includes a resistor in series with said voltage, a network including rectifiers oppositely poled with respect to the alternating output voltage of said amplifier, a source of reference voltage of the same frequency as said alternating component and with respect to which said rectifiers are similarly poled, means for including said resistor in circuit with said rectifier network for traverse by the direct-current output thereof, and direct-current measuring means in circuit with said resistor.

6. A system for measurement of the direct-current component of a voltage varied at constant frequency which comprises an alternating-current amplifier whose input system includes a resistor in series with said voltage, a bridge network in the output system of said amplifier including rectifiers oppositely poled with respect to the amplifier output voltage, a source of voltage of said constant frequency so connected to said bridge circuit that said rectifiers are similarly poled with respect thereto, means for including said resistor in the output system of said bridge network for traverse by its direct current output, and direct-current measuring means in circuit with said resistor.

7. A system for measuring a direct-current voltage which comprises a tuned alternating-current amplifier whose input system includes a feed-back resistor in series with the source of said alternating voltage and means mechanically resonant at the frequency of said tuned amplifier, a network including rectifiers oppositely poled with respect to the alternating output of said amplifier, a source of alternating voltage of the same frequency as said mechanically resonant means and said tuned amplifier, means for including said resistor in circuit with said rectifier for traverse by the direct-current output thereof, and direct-current measuring means in circuit with said resistor.

8. A system for determining the direct current voltage of a source thereof comprising a condenser charged from said source and having relatively movable plate structures, vibratory means for effecting relative movement of said plate structures at a selected frequency, a tuned alternating current amplifier emphasizing voltages at said frequency and having said condenser and a resistor in series connected across its input terminals, a network in the output system of said amplifier including rectifiers oppositely poled with respect to the alternating output voltage thereof, means including said vibratory means for producing a reference alternating voltage of the same frequency as the movement of said plate structures and with respect to which said rectifiers are similarly poled, means for connecting said resistor to said network for flow therethrough of direct current proportional to said first named voltage and in direction determined by the phase relation of said reference voltage and amplifier output voltage, and direct-current measuring means in circuit with said resistor.

DAYTON H. CLEWELL.

REFERENCES CITED

The following references are of record in the file of this patent:

UNITED STATES PATENTS

| Number | Name | Date |
|---|---|---|
| 2,284,476 | MacKay | May 26, 1942 |
| 2,297,543 | Eberhardt et al. | Sept. 29, 1942 |
| 2,363,057 | Gaylord | Nov. 21, 1944 |